United States Patent
Okazaki et al.

(10) Patent No.: US 6,559,577 B2
(45) Date of Patent: May 6, 2003

(54) PRESSURE SENSOR-INCORPORATING SPARK PLUG

(75) Inventors: Koji Okazaki, Aichi (JP); Masayoshi Matsui, Aichi (JP); Takahiro Suzuki, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/981,747

(22) Filed: Oct. 19, 2001

(65) Prior Publication Data

US 2002/0047507 A1 Apr. 25, 2002

(30) Foreign Application Priority Data

Oct. 19, 2000 (JP) .......................................... 2000-319288

(51) Int. Cl.[7] .............................................. H01T 13/40
(52) U.S. Cl. ...................................... 313/118; 313/141
(58) Field of Search ............................... 313/118, 142, 313/141, 134; 73/115

(56) References Cited

U.S. PATENT DOCUMENTS

| | | | | |
|---|---|---|---|---|
| 4,392,082 A | * | 7/1983 | Harada | ........................ 313/118 |
| 5,479,817 A | * | 1/1996 | Suzuki et al. | ................ 313/118 |
| 5,955,826 A | | 9/1999 | Suzuki et al. | ................ 313/142 |

FOREIGN PATENT DOCUMENTS

| | | | | |
|---|---|---|---|---|
| EP | 0 609 787 | | 8/1994 | |
| GB | 2 348 958 | | 10/2000 | |
| JP | 60-138292 | * | 7/1985 | ........... F04B/39/00 |

* cited by examiner

*Primary Examiner*—Michael H. Day
(74) *Attorney, Agent, or Firm*—Sughrue Mion, PLLC (57) ABSTRACT

A pressure sensor-incorporating spark plug including a groove 17e for accommodating an output cable 27 formed on a side surface of a hexagonal portion 17a. A U-shaped member is bent into a tubular shape to obtain a fixing member 31. After the fixing member 31 and the output cable 27 passing through the fixing member 31 are placed in the groove 17e, the fixing member 31 is crimped in the direction of the arrow shown in FIG. 5(*a*), so that the fixing member 31 is deformed to fit the wall surface of the groove 17e. Thus, the output cable 27 is nipped by the fixing member 31, and the fixing member 31 is held within the groove 17e of the hexagonal portion 17a. As a result, the output cable 27 is fixed to the hexagonal portion 17a.

8 Claims, 6 Drawing Sheets

PRESSURE SENSOR-INCORPORATING SPARK PLUG

BACKGROUND OF THE INVENTION

1. Field of the Invention

The present invention relates to a pressure sensor-incorporating spark plug which, is attached to an internal combustion engine in order to generate spark discharge within a cylinder and includes a piezoelectric element for detecting the internal pressure of the cylinder.

2. Description of the Related Art

A spark plug is attached to an internal combustion engine in order to generate spark discharge within a cylinder and thereby burn an air-fuel mixture. In relation to such a spark plug, a pressure sensor-incorporating spark plug is known which includes a built-in pressure sensor for detecting the internal pressure of the cylinder and for outputting an electric signal corresponding to the detected pressure.

Figure 6:
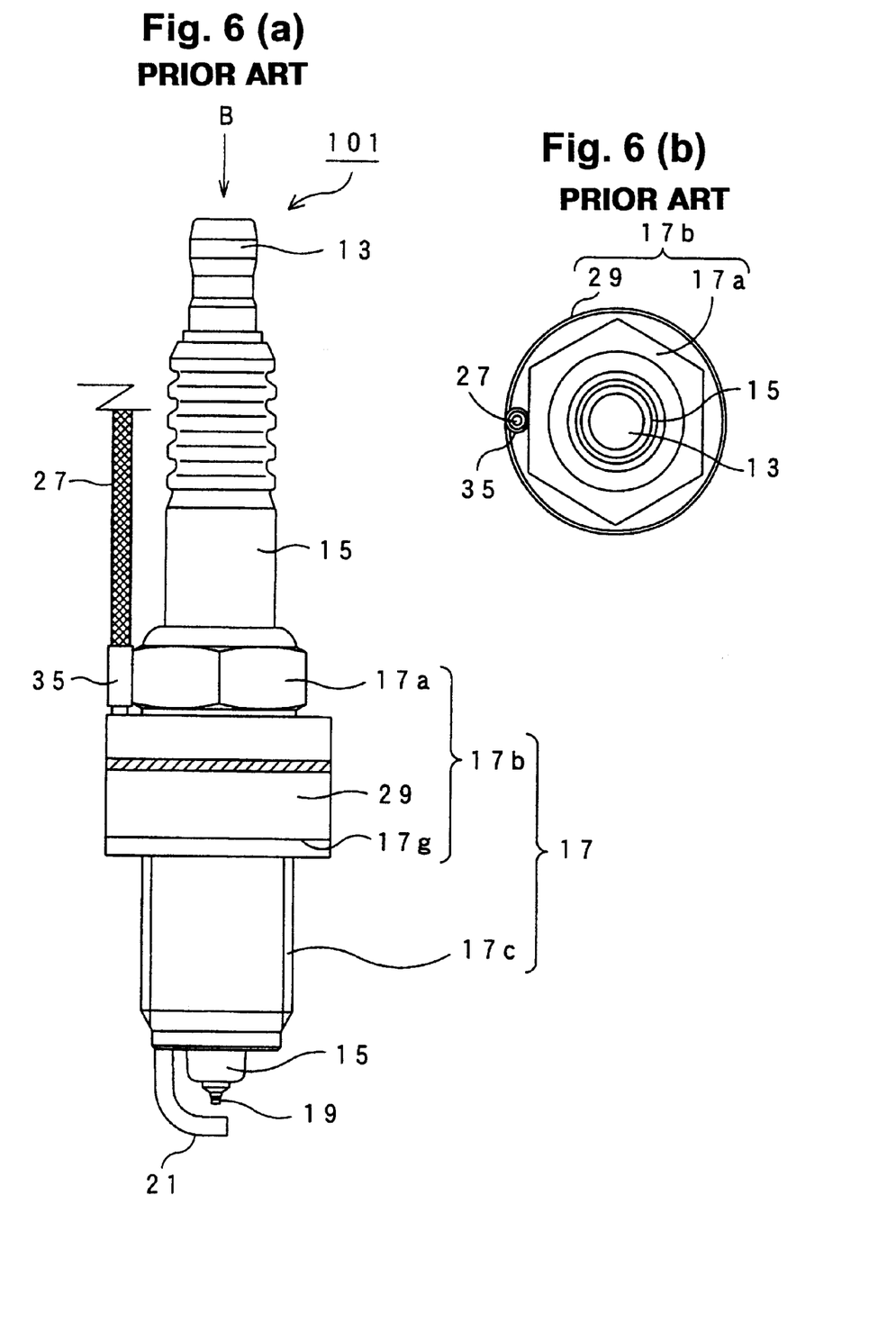
FIG. 6(a) is a structural view showing the external shape of a conventional pressure sensor-incorporating spark plug.
FIG. 6(b) is a plan view of the conventional pressure sensor-incorporating spark plug as viewed from the upper end side (as viewed in the direction of arrow B in FIG. 6(a)).

FIG. 6 shows an exemplary conventional pressure sensor-incorporating spark plug. The pressure sensor-incorporating spark plug 101 shown in FIG. 6(a) includes a substantially cylindrical metallic shell 17 to be attached to an internal combustion engine; a substantially cylindrical insulator 15, which is held by the metallic shell 17 such that its center axis coincides with the center axis of the metallic shell 17; an electricity reception terminal 13, which is disposed at one axial end of the insulator 15 and which receives high voltage for ignition; a center electrode 19, which is disposed at the other axial end of the insulator 15 and is electrically connected to the electricity reception terminal 13 via the interior of the insulator 15; and a ground electrode 21, which is provided at an axial end of the metallic shell 17 corresponding to the axial end of the insulator 15 at which the center electrode 19 is provided.

A radially bulged flange portion 17b is formed at a longitudinal center portion of the metallic shell 17. The flange portion 17b includes a hexagonal portion 17a, which is formed at a portion closer to the electricity reception terminal 13 and onto which a tightening tool is fit; and a sensor case 29, which accommodates a piezoelectric element (not shown) for outputting an electric signal corresponding to the internal pressure of a cylinder. A bottom portion of the sensor case 29 serves as a mounting seat 17g, which abuts a cylinder head upon attachment of the spark plug to the internal combustion engine.

The pressure sensor-incorporating spark plug 101 further includes an output cable 27 for leading to external equipment the electric signal output from the piezoelectric element provided on the metallic shell 17. The output cable 27 is passed through a metal pipe 35, which is fixed to a side surface of the hexagonal portion 17a, and is fixed to the metal pipe 35 to thereby fix the output cable 27 to the hexagonal portion 17a. Thus, the output cable 27 extends from the pressure sensor-incorporating spark plug 101.

The pressure sensor-incorporating spark plug 101 is attached to the cylinder head of the internal combustion engine by means of a screw-engagement groove 17c, which is formed on the metallic shell 17 located between the flange portion 17b and the ground electrode 21. However, as shown in FIG. 6(b), which is a view from above the pressure sensor-incorporating spark plug 101 (as viewed in the direction of arrow B in FIG. 6(a)), the metal pipe 35 is fixed to the side surface of the hexagonal portion 17a, making it impossible to fit an ordinary plug wrench onto the hexagonal portion 17a. Therefore, when the pressure sensor-incorporating spark plug 101 is attached to the cylinder head of the internal combustion engine, a dedicated plug wrench having a slit at a portion corresponding to the metal pipe 35 must be used.

In addition, if such a plug wrench having a slit is used to tighten or remove the pressure sensor-incorporating spark plug 101 in a state in which the plug wrench has not been completely fit onto the hexagonal portion 17a and thus the output cable 27 engages a slit wall, the output cable 27 may be damaged, and in some cases may be pulled out.

In view of this problem, a pressure sensor-incorporating spark plug disclosed in Japanese Utility-Model Application Laid-Open (kokai) No. 60-138292 has been proposed. This pressure sensor-incorporating spark plug is configured such that an output cable is passed through a through hole formed in the hexagonal portion. That is, since the output cable is led outward from an upper end surface (end surface on the electricity reception terminal side), the hexagonal portion can maintain a hexagonal cross section to which an ordinary plug wrench can be fit. Thus, the pressure-sensor-incorporating spark plug can be tightened or removed using an ordinary plug wrench.

The above-described structure eliminates an accident in which the output cable engages a slit wall of a plug wrench, to thereby prevent damage to or pulling out of the output cable.

3. Problems to be Solved by the Invention

However, the pressure sensor-incorporating spark plug described in the above patent publication (Japanese Utility-Model Application Laid-Open No. 60-138292) has a drawback, in that the output cable is susceptible to being pulled out. This is because the output cable is fixed to the wall of the through hole of the hexagonal portion by means of a heat-resistant resin, which is charged into the space between the output cable and the wall of the through hole.

In view of this drawback, the above patent publication discloses an embodiment in which the wall of the through hole is roughened in order to improve the output cable's resistance to being pulled out. However, this raises a problem of an increase in the number of work steps for fixing the output cable.

SUMMARY OF THE INVENTION

In view of the forgoing problems of the prior art, an object of the present invention is to provide a pressure sensor-incorporating spark plug which has a tightening portion onto which an ordinary plug wrench having no slit can be fit, which has an output cable having increased resistance to being pulling out, and which facilitates work for fixing the output cable.

In order to achieve the above object, a first aspect of the invention provides a pressure sensor-incorporating spark plug comprising: a spark plug main body including a substantially cylindrical metallic shell having a radially bulged flange portion at a center portion of the metallic shell, the flange portion having a mounting seat which abuts a cylinder head upon attachment of the spark plug to an internal combustion engine, and a tightening portion which is provided at a location apart from the mounting seat and onto which a tightening tool is fit, the tightening portion having a cross-sectional shape having a vertex portion; a piezoelectric element attached to the metallic shell and outputting an electric signal corresponding to cylinder internal pressure of the internal combustion engine; and an output cable for leading the electric signal generated by the piezoelectric element to the outside. The pressure sensor-incorporating spark plug is further characterized in that a cable accommodation portion for accommodating the output cable is provided at the vertex portion of the tightening portion, and the output cable is placed in the cable accommodation portion and is fixed to the tightening portion by crimping a portion of the tightening portion around the cable accommodation portion.

That is, in the pressure-sensor-incorporating spark plug of the first aspect of the invention, the output cable is placed in the cable accommodation portion and is fixed to the tightening portion by crimping a portion of the tightening portion around the cable accommodation portion, so that the tightening portion nips the output cable to thereby fix the output cable. The cable accommodation portion may be a through hole, where the output cable is passed through the through hole.

Since a structure for fixing the output cable by crimping is employed, the number of work steps can be decreased as compared with the case in which the output cable is fixed to the tightening portion by charging of, for example, a heat resistant resin. Thus, the work for fixing the output cable can be simplified. Further, since the output cable is fixed by crimping, the strength for withstanding pull out (pulling-out resistance) increases, the pull out occurring when an external force is applied to the output cable in the direction for pulling out the output cable.

The cross-sectional shape of the tightening portion having a vertex portion must be determined such that the shape prevents slippage of a tightening tool (e.g., plug wrench), which is fit onto the tightening portion in order to rotate the spark plug about the center axis. An example of such a shape is a polygon such as a hexagon or a pentagon; and the vertex portion refers to a portion in the vicinity of a vertex of the polygon.

With regard to the distance between a side of the polygon and the insulator as measured on the end surface of the tightening portion on the side of the electricity reception terminal, the distance between a vertex of the polygon and the insulator is greater than the distance between a central portion of a side of the polygon and the insulator. Therefore, at a vertex of the polygon, a larger area can be used for providing the cable accommodation portion. In the pressure sensor-incorporating spark plug of the first aspect of the invention, since the cable accommodation portion is provided at a vertex portion of the polygonal portion, a wide region can be secured for disposing the output cable. Accordingly, by virtue of the structure of the cable accommodation portion being provided at a vertex portion of the tightening portion, the output cable does not project from the side surface of the tightening portion. Therefore, the tightening portion can maintain a cross section which enables an ordinary plug wrench to be fit onto the tightening portion.

Therefore, in the first aspect of the invention, since the output cable is fixed by crimping, the number of work steps can be decreased, whereby the work for fixing the output cable can be simplified. Further, a sufficiently high pulling-out resistance can be secured. Moreover, since the cable accommodation portion is provided at a vertex portion of the tightening portion, the tightening portion can maintain a cross section which enables an ordinary plug wrench to be fit onto the tightening portion. Since an ordinary plug wrench can be fit onto the tightening portion, use of a plug wrench having a slit becomes unnecessary, and accidental pulling out of the output cable is prevented.

The cable accommodation portion may be a through hole which penetrates the interior of the tightening portion from an end surface on the side of the electricity reception terminal to an end surface on the side of the mounting seat. Alternatively, the cable accommodation portion may be a groove formed on a side surface of the tightening portion, which surface comes into contact with the inner surface of the plug wrench. As such, the groove extends from the end surface on the side of the electricity reception terminal to the end surface on the side of the mounting seat.

Typically, the output cable consists of a core wire made of an electrically conductive material and a covering layer made of an insulating material and covering the periphery of the core wire. An electric signal generated at the piezoelectric element is output to the outside via the core wire. Further, in one known type of such an output cable, the periphery of the output cable is covered with a shield material made of an electrically conductive material, in order to suppress influence of external noise on an electric signal flowing through the core wire. Such a shield material can prevent superposition of external noise on the electric signal flowing through the core wire disposed inside the cable, because the shield material is made of an electrically conductive material, and is electrically connected to ground (earth). Therefore, the shield material must be electrically connected to ground in a reliable manner.

The shield material may be connected to ground by providing wiring in order to ground the shield material via a connector provided at the end portion of the output cable opposite the piezoelectric element. However, when the shield material is grounded by means of such a method, the shape of the connector becomes complicated. Also, work for providing a wiring line from the connector to the ground becomes necessary, thereby increasing the number of work steps.

The metallic shell of the pressure sensor-incorporating spark plug is made of an electrically conductive material in order to form a path for applying high voltage for ignition, and is grounded upon attachment of the spark plug to an internal combustion engine. Therefore, when the shield material is brought into contact with the tightening portion of the metallic shell, the shield material can be electrically connected to ground.

In view of the foregoing, when an output cable whose periphery is covered with a shield material for suppressing influence of external noise is used in the above-described pressure sensor-incorporating spark plug of the first aspect, as described in a second aspect of the invention, the shield material is preferably grounded via the tightening portion, by establishing contact between the shield material and the tightening portion.

That is, when the tightening portion is deformed by crimping, the output cable is fixed to the tightening portion, and simultaneously, the shield material is brought into contact with the tightening portion to thereby establish electrical connection between the shield material and the tightening portion. Therefore, when the pressure sensor-incorporating spark plug is attached to an internal combustion engine, the metallic shell is electrically connected to the ground, so that the shield material is connected to ground.

Therefore, in the second aspect of the invention, by crimping work, wiring for grounding the shield material can be formed simultaneously with fixing of the output cable. Thus, separate work for providing wiring for grounding the shield material becomes unnecessary, so that the number of steps can be reduced.

Incidentally, when the cable accommodation portion is formed by a through hole, the operation of nipping the output cable by deforming the tightening portion by crimping can be performed with relative ease when the cross-sectional area of the through hole is set to a size corresponding to the cross-sectional area of the output cable.

However, when the cable accommodation portion is formed by a groove, a portion which deforms due to crimping cannot attain a sufficiently large volume by merely forming a groove on the tightening portion. In view of the foregoing, in order to reliably nip the output cable accommodated in the cable accommodation portion in the form of a groove, desirably an extension portion is provided which extends from the tightening portion at the vicinity of the cable accommodation portion, and the extension portion is deformed by crimping to thereby nip the output cable. However, when such an extension portion is provided, the shape of the tightening portion becomes complex, and the number of work steps for forming the tightening portion increases.

A third aspect of the invention, which has been accomplished to solve the above-described problem, provides a pressure sensor-incorporating spark plug comprising: a spark plug main body including a substantially cylindrical metallic shell having a radially bulged flange portion at a center portion of the metallic shell, the flange portion having a mounting seat which abuts a cylinder head upon attachment of the spark plug to an internal combustion engine, and a tightening portion provided at a location apart from the mounting seat and onto which a tightening tool is fit, the tightening portion having a cross-sectional shape having a vertex portion; a piezoelectric element attached to the metallic shell and outputting an electric signal corresponding to cylinder internal pressure of the internal combustion engine; and an output cable for leading to the outside the electric signal generated by the piezoelectric element. The pressure sensor-incorporating spark plug further comprise a groove for accommodating the output cable provided on a surface of the tightening portion, and a fixing member for fixing the output cable to the groove, wherein the output cable is fixed to the groove by means of the fixing member.

That is, in the pressure sensor-incorporating spark plug of the third aspect of the invention, the output cable is placed in the groove and is fixed to the tightening portion by means of the fixing member.

By virtue of the structure for fixing the output cable by means of the fixing member, the work for forming on the tightening portion an extension portion or a like for nipping the output cable can be eliminated. Further, the output cable can be reliably fixed to the groove.

In an example case in which the tightening portion is formed to have a hexagonal cross section, the groove is provided at a vertex portion of the hexagon. In such case, if an extension portion is provided at the vicinity of the groove and the tightening portion (extension portion) is deformed by crimping in order to nip the output cable, the extension portion must be formed to have a considerably large size. In such case, the work for forming the tightening portion becomes more complicated. By contrast, in the third aspect of the invention, the fixing member enables easy fixing of the output cable without providing an extension portion.

In a fourth aspect of the invention, the fixing member is preferably a member having a shape for surrounding the output cable. After the output cable is passed through the fixing member, the fixing member is placed in the groove. In such state, the fixing member is deformed in a direction perpendicular to the passing direction of the output cable. As a result, the fixing member expands along the width direction of the groove to thereby be held by the groove, and shrinks along the depth direction of the groove to thereby nip the output cable.

An example of the fixing member having a shape for surrounding the output cable is a fixing member having a tubular shape.

After the fixing member, through which the output cable has been passed, is placed in the groove, the fixing member is deformed such that the fixing member expands in the width direction of the groove. As a result, the outer surface of the fixing member comes into contact with the wall surface of the groove, and, by virtue of stress generated by deforming the fixing member, the fixing member is held by the wall surfaces (opposite side surfaces with respect to the width direction) of the groove.

Further, by virtue of such deformation of the fixing member, the fixing member shrinks along the depth direction of the groove. Therefore, the fixing member nips the output cable in a state in which the inner surface of the fixing member is in contact with the surface of the output cable.

As described above, the output cable is nipped by the fixing member; and the fixing member is fixedly held within the groove of the tightening portion. As a result, the output cable is fixed to the tightening portion.

Therefore, in the fourth aspect of the invention, by using the fixing member, the output cable can be reliably fixed to the groove formed on the tightening portion.

Notably, a seamless pipe-like member may be used as the fixing member having a shape for surrounding the periphery of the output cable. Alternatively, a plate member bent into a tubular shape may be used as the fixing member.

Further, a fixing member which does not surround the periphery of the output cable may be used. An example of such a fixing member is a wedge-shaped fixing member, which is inserted into the clearance between the output cable and the wall surface of the groove to thereby fix the output cable to the groove.

When the periphery of the output cable is covered with a shield material for suppressing influence of external noise, as described previously, wiring for connecting the shield material to the ground must be provided, thereby increasing the number of work steps.

In view of the foregoing, when an output cable whose periphery is covered with a shield material for suppressing influence of external noise is used in the above-described pressure-sensor-incorporating spark plug (the third and fourth aspects of the invention), in a fifth aspect of the invention, the fixing member is preferably formed of an electrically conductive material, and the shield material is preferably connected electrically to the tightening portion via the fixing member, whereby the shield material is grounded via the tightening portion.

That is, when the output cable is fixed to the groove by using the fixing member, the shield material comes into contact with the fixing member, and the fixing member comes into contact with the tightening portion, whereby electrical connection is established between the shield material and the tightening portion via the fixing member. The fixing member fixed to the groove is electrically connected to the metallic shell; and when the pressure sensor-incorporating spark plug is attached to an internal combustion engine, the metallic shell is electrically connected to the ground. Thus, the shield material is connected to the ground.

Therefore, in the fifth aspect of the invention, simultaneously with fixing of the output cable by means of the fixing member, wiring for grounding the shield material can be formed. Thus, separate work for providing wiring for grounding the shield material becomes unnecessary, so that the number of steps can be reduced.

When a member, such as a tubular member, which surrounds the radial periphery of the output cable is used as a fixing member, the surface of the output cable (specifically, the shield material) does not come into direct contact with the wall surface of the groove. Therefore, in such a case, the fixing member must be made of an electrically conductive material. However, when a fixing member, such as a wedge-shaped fixing member, which can establish direct contact between the surface of the output cable (specifically, the shield material) and the wall surface of the groove is employed, the fixing member may be made of a material having no electrically conductivity.

Incidentally, when a connector is attached to an end portion of the output cable, an electrode terminal disposed inside the connector is connected to the core wire of the output cable by means of crimping. In such a case, as compared with an output cable having a thin core wire, an output cable having a thick core wire enables a crimping portion of the electrode terminal to hold the core wire more reliably, to thereby lower the possibility of the electrode terminal coming off. Further, as compared with an output cable having a thin core wire, an output cable having a thick core wire has a lower line resistance, to thereby reduce power loss in the line.

However, in order to use an output cable having a thick core wire, a region (area) which enables such output cable to be disposed must be secured on the end surface of the tightening portion on the side of the electricity reception terminal.

In view of the foregoing, when an output cable having a thick core wire is used in the above-described pressure sensor-incorporating spark plug (any of the first through fifth aspects of the invention), as described in a sixth aspect of the invention, the tightening portion preferably has a cross section of a hexagon; the distance between opposite sides of the hexagon is preferably 15.5 to 16 mm; and the difference between the diameter of the insulator and the distance between opposite sides of the hexagon is preferably 6.3 to 7.2 mm.

In most conventional pressure sensor-incorporating spark plugs, in general, the tightening portion has a hexagonal cross section; the distance between opposite sides of the hexagon is 15.5 to 16 mm; and the diameter of the insulator is 10.3 to 10.7 mm. Therefore, the difference between the diameter of the insulator and the distance between opposite sides of the hexagon is 4.8 to 5.7 mm. By contrast, in the case of a pressure sensor-incorporating spark plug whose insulator is formed to have a diameter of 8.8 to 9.2 mm, the difference between the diameter of the insulator and the distance between opposite sides of the hexagon can be increased to 6.3 to 7.2 mm. Therefore, the end surface of the tightening portion on the side of the electricity reception terminal increases, so that the region available for disposing the output cable can be widened.

In the pressure sensor-incorporating spark plug of the sixth aspect of the invention, since the area of the end surface of the tightening portion on the side of the electricity reception terminal can be increased employing a thinner insulator, an output cable having a thick core wire can be disposed. Therefore, the hexagonal shape of the tightening portion can be maintained, to thereby enable use of an ordinary plug wrench. In addition, this arrangement can prevent the electrode terminal provided at the end portion of the output cable from coming off, and line loss can be reduced.

BRIEF DESCRIPTION OF THE DRAWINGS

FIGS. 2(a) and (b) are cross-sectional views of the hexagonal portion of the pressure sensor-incorporating spark plug of the first embodiment, wherein 2(a) shows the state before the output cable is passed through, and FIG. 2(b) shows the state after the output cable is passed through and fixed.

FIG. 4 shows the results of measurement performed in order to measure the influence of external noise on an electric signal corresponding to cylinder internal pressure, wherein FIG. 4(a) shows the measurement result for the case where the shield material of the output cable is not grounded, and FIG. 4(b) shows the measurement result for the case where the shield material of the output cable is grounded.

FIGS. 5(a) and (b) are cross-sectional views of the hexagonal portion of the pressure sensor-incorporating spark plug of a second embodiment, wherein FIG. 5(a) shows the state before the output cable is passed through, FIG. 5(b) shows the state after the output cable is passed through and fixed, and FIG. 5(c) is a perspective view of the fixing member.

DESCRIPTION OF REFERENCE NUMERALS:

1—pressure sensor-incorporating spark plug
13—electricity reception terminal
15—insulator
17—metallic shell
17a—hexagonal portion
17b—flange portion
17d—cable accommodation portion
17e—groove
17g—mount seat portion
19—center electrode
21—ground electrode
25—piezoelectric element
27—output cable
27c—shield material
31—fixing member

DESCRIPTION OF THE PREFERRED EMBODIMENTS

Preferred embodiments of the present invention will now be described with reference to the drawings. However, the present invention should not be construed as being limited thereto.

Figure 1:
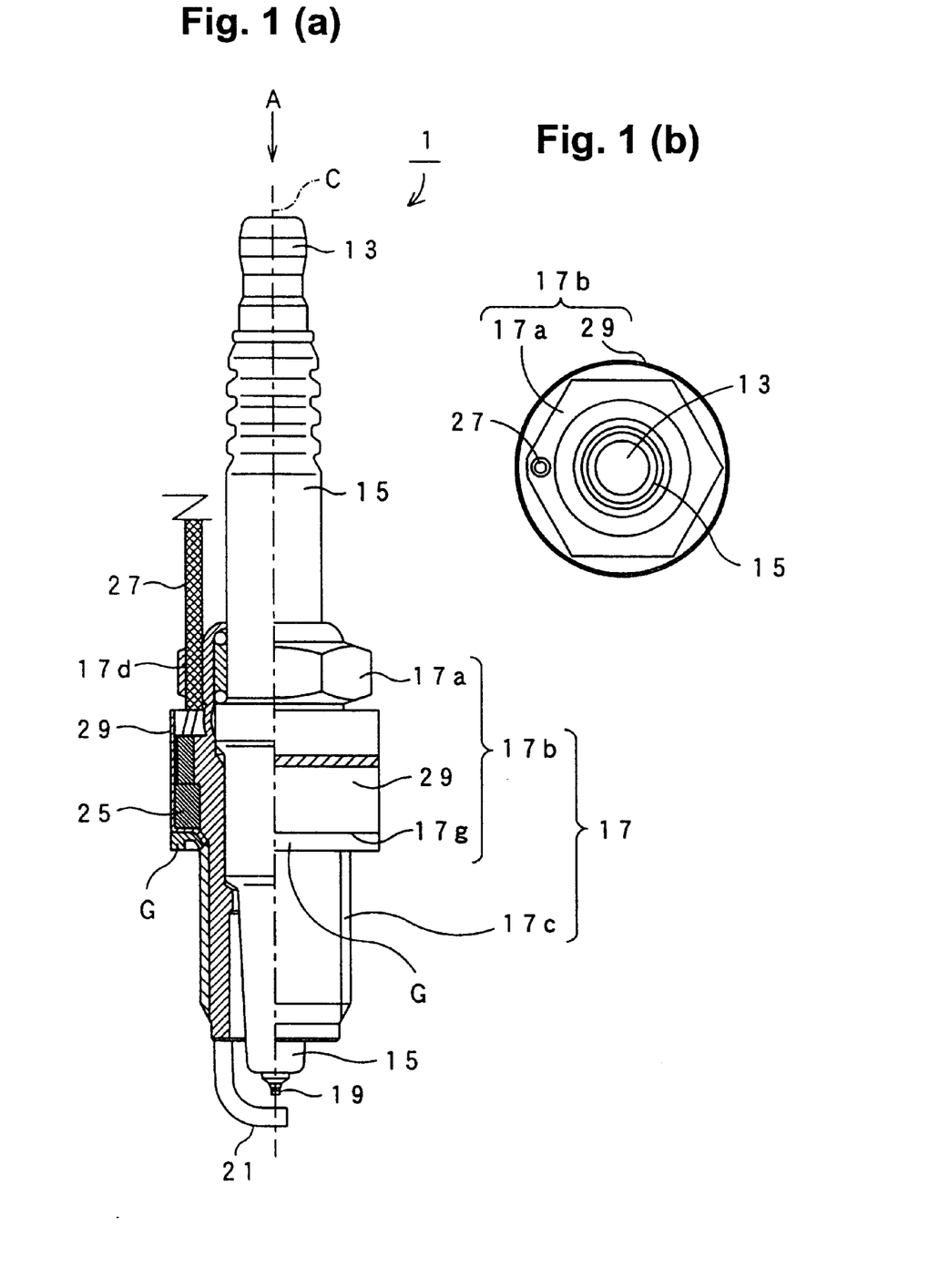
FIG. 1(a) is a view showing the structure of a pressure sensor-incorporating spark plug according to an embodiment of the invention, depicting a left half of the pressure sensor-incorporating spark plug in cross section so as to show the internal structure thereof.
FIG. 1(b) is a plan view of the pressure sensor-incorporating spark plug as viewed from the upper end side (as viewed in the direction of arrow A in FIG. 1(a)).

FIG. 1 is a view showing the structure of a pressure sensor-incorporating spark plug according to an embodiment of the present invention. Notably, in FIG. 1(a), a left half of the pressure sensor-incorporating spark plug is depicted in cross section in order to show the internal structure thereof; and FIG. 1(b) shows a plan view of the pressure sensor-incorporating spark plug as viewed from the upper end side (in the direction of arrow A in FIG. 1(a)).

As shown in FIG. 1(a), a pressure sensor-incorporating spark plug 1 (hereinafter also referred to as spark plug 1) includes a substantially cylindrical metallic shell 17 to be attached to an internal combustion engine; a substantially cylindrical insulator 15, which is held by the metallic shell 17 in such manner that its center axis coincides with the center axis C of the metallic shell 17; an electricity reception terminal 13, which is disposed at one axial end of the insulator 15 and is used for receiving high voltage for ignition; a center electrode 19, which is disposed at the other axial end of the insulator 15 and is electrically connected to the electricity reception terminal 13 via the interior of the insulator 15; and a ground electrode 21, which is provided at an axial end of the metallic shell 17 corresponding to the axial end of the insulator 15 at which the center electrode 19 is provided.

Notably, in the following descriptions, an axial end portion of the spark plug 1 at which the electricity reception terminal 13 is present will be referred to as the upper end side; and the opposite axial end portion of the spark plug 1, at which the center electrode 19 is present, will be referred to as the lower end side.

A portion of the insulator 15 located on the upper end side of the metallic shell 17 is formed to have a circular cross section having a diameter of 9 mm, as measured along a plane perpendicular to the center axis C.

The metallic shell 17 has a radially bulged flange portion 17b, which is formed at an axially central portion of the metallic shell 17; and a screw-engagement groove 17c, which is formed on a portion of the metallic shell 17 on the lower end side of the flange portion 17 and is used to attach the pressure sensor-incorporating spark plug 1 to an internal combustion engine.

The flange portion 17b includes a hexagonal portion 17a, which is formed at a portion closer to the electricity reception terminal 13 and which receives a tightening tool; and a sensor case 29, which accommodates a piezoelectric element 25 for outputting an electric signal corresponding to the internal pressure of a cylinder.

The hexagonal portion 17a has the form of a hexagonal column onto which a plug wrench can be fit. The plug wrench is a tool used for attaching the pressure sensor-incorporating spark plug 1 to the internal combustion engine. The hexagonal portion 17a is formed such that the distance between opposite sides of the hexagon is 16 mm. Notably, the hexagonal portion 17a corresponds to the tightening portion.

The sensor case 29 has a shape of a bottomed cylinder. An opening for allowing passage of the screw-engagement groove 17c of the metallic shell 17 is formed at a central portion of the bottom wall of the sensor case 29. The sensor case 29 is attached to the metallic shell 17 from the lower end side thereof to thereby form a portion of the flange portion 17b. The bottom portion of the sensor case 29 serves as a mounting seat 17g, which abuts a cylinder head upon attachment of the spark plug 1 to the internal combustion engine.

The sensor case 29 is attached to the metallic shell 17 after placement of the piezoelectric element 25 and an output cable 27, which will be described below.

The output cable 27 is provided in the pressure sensor-incorporating spark plug 1 in order to lead to external equipment the electric signal output from the piezoelectric element 25 built in the metallic shell 17. The output cable 27 whose one end is connected to the piezoelectric element 25 extends from the piezoelectric element 25 to the hexagonal portion 17a. The output cable 27 is then passed through a cable accommodation portion 17d of the hexagonal portion 17a, and led to the outside from the upper end surface of the hexagonal portion 17a.

The cable accommodation portion 17d of the hexagonal portion 17a is a through hole which penetrates from the upper end surface (on the side where the electricity reception terminal 13 is present) to the lower end surface (on the side where the mounting seat 17g is present) of the hexagonal portion 17a at a vertex portion of the hexagon.

When the pressure sensor-incorporating spark plug 1 is attached to an internal combustion engine, a gasket G is interposed between the bottom surface of the sensor case 29 and the cylinder head of the internal combustion engine in order to maintain the gas-tightness of the interior of the cylinder.

Figure 2:
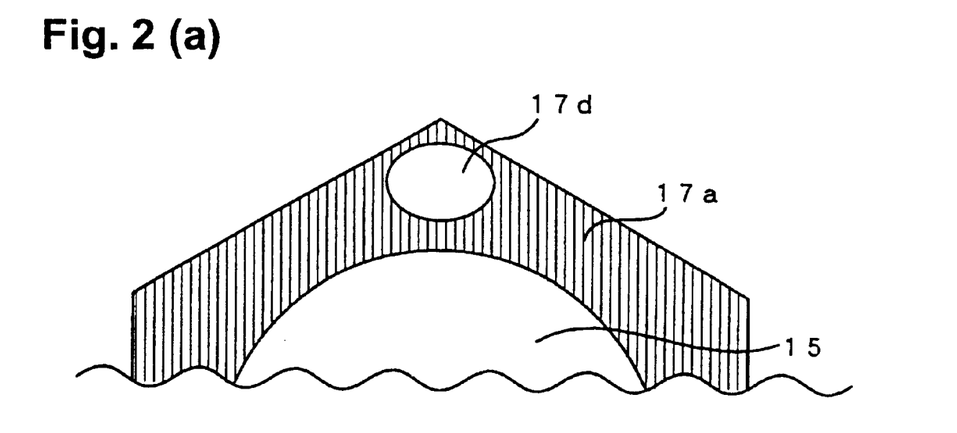

Here, the step for fixing the output cable 27 to the cable accommodation portion 17d will be described with reference to FIG. 2. Notably, FIG. 2 shows a cross section of the hexagonal portion 17a taken along a plane perpendicular to the direction of insertion of the output cable 27.

FIG. 2(a) shows the cable accommodation portion 17d before the output cable 27 is passed therethrough. As described above, the cable accommodation portion 17d is a through hole which penetrates the interior of the hexagonal portion 17a from the surface on the side of the electricity reception terminal to the surface on the side of the mounting seat, at a vertex portion of the hexagon. Notably, the cable accommodation portion 17d is formed to have a size (cross sectional area) which enables the output cable 27 to be clamped by deforming the hexagonal portion 17a.

After the output cable 27 is passed through the cable accommodation portion 17d, the vertex portion of the hexagonal portion 17a is crimped in the direction of the arrow in FIG. 2(b) by use of a crimping jig, to thereby deform the hexagonal portion 17a. Thus, the output cable 27 is nipped by the inner wall surface of the cable accommodation portion 17d, so that the output cable 27 is fixed to the hexagonal portion 17a.

The output cable 27 is formed to have a cross sectional configuration such that a core material 27a formed of an electrically conductive material is disposed at the center, a covering layer 27b formed of an insulating material is disposed around the core material 27a, and a shield material 27c formed of an electrically conductive material is disposed around the covering layer 27b.

Therefore, as shown in FIG. 2(b), when the output cable 27 is fixed to the cable accommodation portion 17d, the shield material 27c comes into contact with the inner wall surface of the cable accommodation portion 17d, so that the shield material 27c is electrically connected to the hexagonal portion 17a (i.e., the metallic shell 17). When the pressure sensor-incorporating spark plug 1 is attached to the internal combustion engine, the metallic shell 17 is grounded via the screw-engagement groove 17c, so that the shield material 27c is grounded via the hexagonal portion 17a. Notably, the shield material 27c is not provided for a portion of the output cable 27 located in the sensor case 29.

Figure 3:
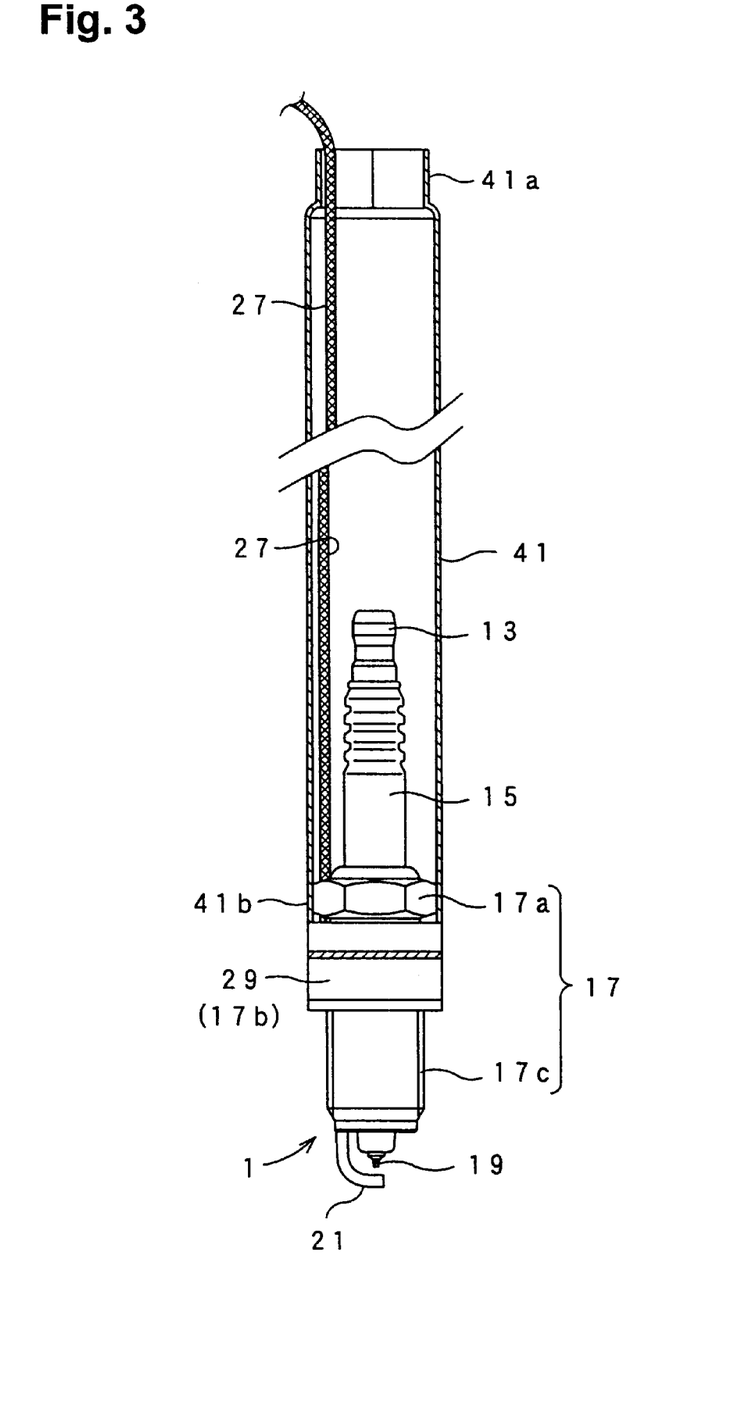
FIG. 3 is an explanatory view showing the pressure sensor-incorporating spark plug with a plug wrench fit thereon.

FIG. 3 shows the pressure sensor-incorporating spark plug 1 with a plug wrench 41 fit thereon. In FIG. 3, the plug wrench 41 is shown in cross section.

As shown in FIG. 3, the plug wrench 41 is in the form of an elongated cylindrical tube whose opposite ends are open. The plug wrench 41 has an upper end portion 41a onto which a tightening tool (e.g., a hexagonal wrench) can be fit, and a lower end portion 41b which can be fit onto the hexagonal portion 17a of the pressure sensor-incorporating spark plug 1. Each of the upper end portion 41a and the lower end portion 41b has a hexagonal cross section.

When the plug wrench 41 is to be fit onto the pressure sensor-incorporating spark plug 1, the output cable 27 is first passed through the interior of the plug wrench 41 from the lower end portion 41b to the upper end portion 41a thereof. Subsequently, a portion of the pressure sensor-incorporating spark plug 1, from the electricity reception terminal 13 to the hexagonal portion 17a, can be inserted into the interior of the plug wrench 41; and the lower end portion 41b is fit onto the hexagonal portion 17a. Thus, the plug wrench 41 is fit onto the pressure sensor-incorporating spark plug 1.

The pressure sensor-incorporating spark plug 1, onto which the plug wrench 41 has been fit, is inserted into a plug hole provided in the cylinder head of the internal combustion engine; and a tightening tool (e.g., a hexagonal wrench) is fit onto the upper end portion 41a of the plug wrench 41. Subsequently, the tightening tool is rotated in order to tighten the pressure sensor-incorporating spark plug 1, so that the pressure sensor-incorporating spark plug 1 is mounted to the internal combustion engine.

As described above, in the pressure sensor-incorporating spark plug 1 of the present embodiment, the output cable 27 is clamped by placing the output cable 27 in the cable accommodation portion 17d, and by deforming a portion of the hexagonal portion 17a surrounding the cable accommodation portion 17d by means of crimping, to thereby nip the output cable 27.

Since the pressure sensor-incorporating spark plug 1 has a structure such that the output cable 27 is fixed to the hexagonal portion 17a through crimping, the number of work steps can be decreased as compared with the case in which the output cable 27 is fixed to the hexagonal portion 17a by charging of, for example, a heat resistant resin. Thus, the work for fixing the output cable can be simplified. Further, since the output cable is fixed by crimping, the strength for withstanding pull out (pulling-out resistance) increases so as to prevent pulling out of the output cable even when an external force is applied to the output cable in the direction for pulling out the cable.

In the pressure sensor-incorporating spark plug 1 of the present embodiment, the cable accommodation portion 17d is provided at a vertex portion of the hexagonal portion 17a; the diameter of the insulator 15 is 9 mm; and the distance between the opposite sides of the hexagonal portion 17a is 16 mm. Therefore, a wide region can be secured for disposition of the output cable 27. Accordingly, the output cable 27 does not project from the side surface of the hexagonal portion 17a, and thus maintains the hexagonal cross section of the hexagonal portion 17a, so that an ordinary plug wrench having no slit can be fit onto the hexagonal portion 17a.

As described above, the pressure sensor-incorporating spark plug of the present embodiment simplifies the work for fixing the output cable, to thereby reduce production cost. In addition, since the output cable has sufficiently high resistance to pulling out, an accident of the output cable being pulled out can be prevented. Moreover, since the cable accommodation portion is provided at a vertex portion of the hexagonal portion, the hexagonal cross section of the hexagonal portion can be maintained, and thus an ordinary plug wrench can be fit onto the hexagonal portion. Therefore, use of a plug wrench having a slit becomes unnecessary, thereby preventing accidental pulling out of the output cable.

In the pressure sensor-incorporating spark plug 1 of the present embodiment, the shield material 27c is provided at the surface of the output cable 27 facing the cable accommodation portion 17d. Therefore, when the hexagonal portion 17a is deformed by crimping in order to fix the output cable 27, electrical connection is established between the shield material 27c and the hexagonal portion 17a. Therefore, through crimping work, wiring for grounding the shield material 27c can be formed simultaneously with fixing the output cable 27. Thus, separate performance of the work for providing wiring for grounding the shield material 27c becomes unnecessary, thereby reducing the number of steps.

Figure 4:
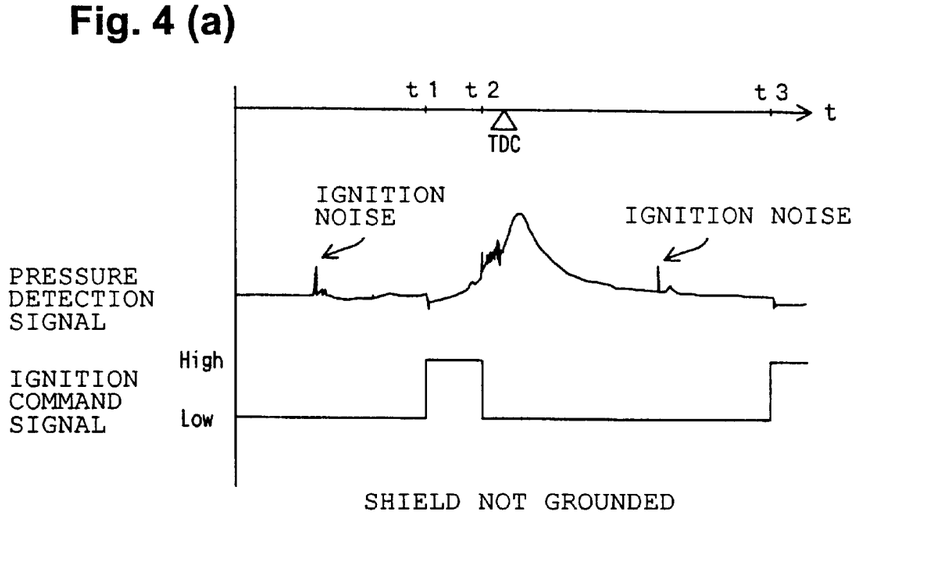

When the internal pressure of a cylinder is detected by use of the pressure sensor-incorporating spark plug of the first embodiment, an electric signal corresponding to the cylinder internal pressure is output from the output cable. However, the electric signal my be influenced by external noise. A measurement for determining the influence of external noise was performed for the case where the shield material of the output cable was grounded and for the case where the shield material of the output cable was not grounded. FIG. 4 shows the results of the measurement. The measurement and measurement results will be described below.

In the measurement, a 4-cylinder engine (displacement: 2,000 cc) was operated at 2,000 rpm under conditions such that output torque was 110 N·m and the ignition timing was set to 22° before the crankshaft reaches top dead center (i.e., BTDC 22°); and an electric signal output from the pressure-sensor-incorporating spark plug and corresponding to the cylinder internal pressure was recorded. The above measurement was performed for the case where the shield material of the output cable was grounded and for the case where the shield material of the output cable was not grounded. FIG. 4(a) shows the measurement result for the case where the shield material of the output cable was not grounded. FIG. 4(b) shows the measurement result for the case where the shield material of the output cable was grounded.

Here, signal waveforms shown in FIG. 4 will be described. FIG. 4 shows the waveform of a pressure detection signal (i.e., an electric signal output from the pressure sensor-incorporating spark plug and corresponding to the cylinder internal pressure) and the waveform of an ignition command signal for causing the spark plug to produce spark discharge.

The pressure detection signal assumes a larger value as the cylinder internal pressure increases; i.e., the peak height of the waveform shown in FIG. 4 increases with the cylinder internal pressure.

The ignition command signal is a command signal used for controlling primary current flowing through the primary winding of an ignition coil. In the case of the engine used in the measurement, when the ignition command signal is low, primary current is not supplied to the primary winding; and when the ignition command signal is high, primary current is supplied to the primary winding. That is, when the level of the ignition command signal changes from low to high, primary current starts to flow; and when the level of the ignition command signal changes from high to low, the flow of the primary current stops. In accordance with the supply and stop of the primary current, the magnetic flux density of the ignition coil changes drastically, so that high voltage for ignition is generated across the secondary winding of the ignition coil. When the thus-generated high voltage for ignition is applied to the electricity reception terminal of the pressure sensor-incorporating spark plug, spark discharge is produced between the center electrode and the ground electrode.

In FIG. 4(a), at time t1, the level of the ignition command signal changes from low to high, so that supply of primary current starts; and at time t2, the level of the ignition command signal changes from high to low, so that the supply of the primary current stops, and thus, the pressure sensor-incorporating spark plug generates spark discharge. In FIG. 4(b), at time t11, the level of the ignition command signal changes from low to high, so that supply of primary current starts; and at time t12, the level of the ignition command signal changes from high to low, so that the supply of the primary current stops, and thus, the pressure sensor-incorporating spark plug generates spark discharge.

Each of time t2 and time t12 is an ignition timing which is earlier by 22° than the top dead center of the crank angle (hereinafter also referred to as TDC). Time t3 in FIG. 4(a) and time t13 in FIG. 4(b) each represents a point in time at which supply of primary current starts in the next combustion cycle.

In both FIG. 4(a) and FIG. 4(b), the value of the pressure detection signal increases immediately after the ignition timing (time t2 in FIG. 4(a), time t12 in FIG. 4(b)); reaches the maximum value at a point in time slightly after TDC; and then decreases gradually.

However, the waveform of the pressure detection signal shown in FIG. 4(a) is disturbed at some points, due to influence of ignition noise from other cylinders. Further, at a point immediately after the ignition timing (time t2), the waveform of the pressure detection signal is disturbed. By contrast, the waveform of the pressure detection signal shown in FIG. 4(b) includes no disturbance, thus demonstrating that influence of ignition noise is suppressed.

Therefore, the above-described measurement results demonstrate that influence of external noise such as ignition noise can be suppressed when the shield material of the output cable of the pressure sensor-incorporating spark plug is grounded.

In the pressure-sensor-incorporating spark plug of the first embodiment, since wiring for grounding the shield material 27c can be formed simultaneously with fixing the output cable 27, influence of external noise on the electric signal can be sufficiently suppressed.

Although the pressure sensor-incorporating spark plug according to the first embodiment of the present invention has been described, the present invention is not limited to this embodiment, and may be practiced in various forms.

In this regard, a pressure-sensor-incorporating spark plug according to a second embodiment, in which a fixing member is used for fixing the output cable to the hexagonal portion, will be described.

Figure 5:
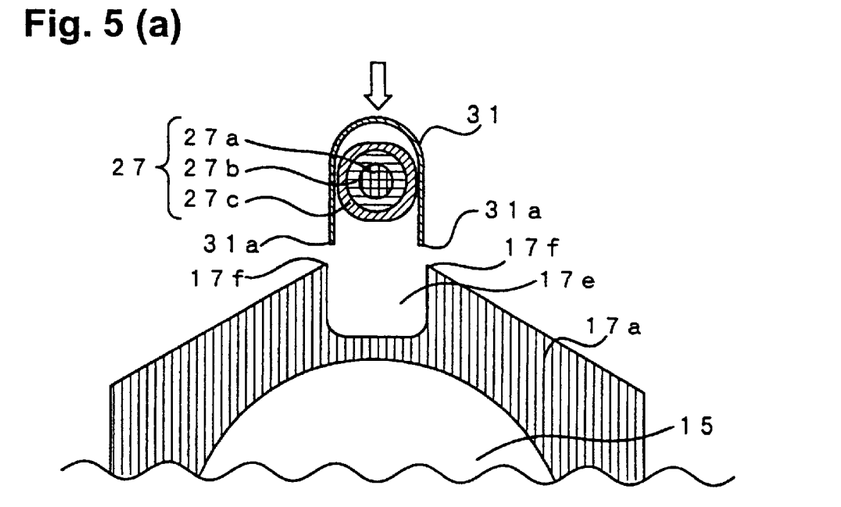

Since the pressure-sensor-incorporating spark plug of the second embodiment as shown in FIG. 5 has the same structure as that of the first embodiment shown in FIG. 1 except for the structure of a portion for fixing the output cable, mainly the portion that differs from that of the first embodiment will be described. The same reference numerals are used to identify the same structural elements of the pressure sensor-incorporating spark plug shown in FIG. 1.

In the pressure sensor-incorporating spark plug of the second embodiment, a groove 17e for accommodating the output cable 27 is formed on the side surface of the hexagonal portion 17a, which surface comes into contact with a tightening tool. The groove 17e extends from the upper end surface (on the side of the electricity reception terminal 13) to the lower end surface (on the side of the mounting seat 17g) of the hexagonal portion 17a.

FIG. 5 shows a cross sectional view of the hexagonal portion 17a of the pressure sensor-incorporating spark plug of the second embodiment taken along a plane perpendicular to the direction of passage of the output cable 27. FIG. 5(a) shows a state before the output cable 27 is fixed, and FIG. 5(b) shows a state after the output cable 27 is fixed.

As shown in FIG. 5(a), the groove 17e is formed on the hexagonal portion 17a located at a vertex portion of the hexagonal cress section and having a size (cross-sectional area) sufficient for accommodating the output cable 27.

Next, the steps of fixing the output cable 27 to the groove 17e will be described. In the second embodiment, a fixing member 31 shown in FIG. 5(c) is used for fixing the output cable 27. The fixing member 31 is a curved plate made of a conductive material and having a U-shaped cross-section.

First, as shown in FIG. 5(a), the output cable 27 is inserted into the fixing member 31 from the open side of the U, so that the output cable 27 is disposed inside the fixing member 31. Subsequently, two end portions 31a of the fixing member 31 are bent such that the end portions 31a overlap each other, so that the fixing member 31 is formed into a tubular shape. Subsequently, the output cable 27 surrounded by the fixing member 31 is disposed within the groove 17e together with the fixing member 31.

After placing the output cable 27 and the fixing member 31 within the groove 17e, the fixing member 31 is crimped in the direction of the arrow shown in FIG. 5(a) by use of a crimping jig, so that the fixing member 31 deforms to fit the wall surface of the groove 17e.

During the deformation of the fixing member 31 to fit the wall surface of the groove 17e, the fixing member 31 expands along the width direction of the groove 17e shown in FIG. 5(b). Therefore, due to stress generated by deforming the fixing member 31, the fixing member 31 is held by the wall surfaces (opposite side surfaces with respect to the width direction) of the groove 17e. At that time, the fixing member 31 shrinks along the depth direction of the groove 17e shown in FIG. 5(b). Therefore, the fixing member 31 nips the output cable 27 in a state in which the inner surface of the fixing member 31 is in contact with the surface of the output cable 27.

As described above, the output cable 27 is nipped by the fixing member 31; and the fixing member 31 is fixedly held within the groove 17e of the hexagonal portion 17a. As a result, the output cable 27 is fixed to the hexagonal portion 17a.

Subsequently, edge portions 17f of the hexagonal portion 17a located on opposite sides of the groove 17e are deformed toward the interior of the groove 17e by means of crimping, in order to prevent the output cable 27 and the fixing member 31 from coming out of the groove 17e.

The output cable 27 whose one end is connected to the piezoelectric element 25 extends from the piezoelectric element 25 to the metallic shell 17; is fixed to the groove 17e of the hexagonal portion 17a by means of the fixing member 31; and is led to the outside from the upper end surface of the hexagonal portion 17a.

As in the case of the first embodiment, the output cable 27 is formed to have a cross sectional configuration such that a core material 27a formed of an electrically conductive material is disposed at the center, a covering layer 27b formed of an insulating material is disposed around the core material 27a, and a shield material 27c formed of an electrically conductive material is disposed around the covering layer 27b.

Therefore, as shown in FIG. 5(b), when the output cable 27 having exposed shield material 27c is fixed to the groove 17e by means of the fixing member 31, the shield material 27c comes into contact with the fixing member 31. Further, at that time, the fixing member 31 comes into contact with the wall surface of the groove 17e. Therefore, the shield material 27c is electrically connected to the hexagonal portion 17a (i.e., the metallic shell 17). When the pressure sensor-incorporating spark plug of the second embodiment is attached to the internal combustion engine, the metallic shell 17 is grounded via the screw-engagement groove 17c, so that the shield material 27c is grounded via the hexagonal portion 17a. Notably, the shield material 27c is not provided for a portion of the output cable 27 located in the sensor case 29.

As described above, the pressure sensor-incorporating spark plug of the second embodiment employs a structure such that the output cable 27 is fixed to the groove 17e by means of the fixing member 31. Therefore, the work for forming on the hexagonal portion 17a an extension portion or the like for nipping the output cable 27 can be omitted; and the output cable 27 can be reliably fixed to the groove 17e.

In the second embodiment as well, wiring for grounding the shield material 27c can be formed simultaneously with fixing the output cable 27 by means of the fixing member 31. Thus, separate work for providing wiring for grounding the shield material 27c becomes unnecessary, so that the number of steps can be reduced.

In the second embodiment, a plate member bent into a tubular shape is used as the fixing member 31. However, a seamless pipe-like member may be used as the fixing member. When a pipe-shaped fixing member is used, the output cable is fixed to the hexagonal portion (groove) by passing the output cable through the pipe-shaped fixing member, placing the fixing member and the output cable into the groove, and deforming the fixing member by crimping.

Although embodiments of the pressure sensor-incorporating spark plug according to the present invention have been described, the present invention is not limited to the above-described embodiments, and may be practiced in various forms. It is intended that such changes be included within the spirit and scope of the claims appended hereto.

For example, in the pressure sensor-incorporating spark plug in which the output cable is fixed by the fixing member, a wedge-shaped member serving as the fixing member may be inserted into the clearance between the output cable and the wall surface of the groove to thereby fix the output cable to the groove.

This application is based on Japanese Patent Application No. 2000-319288 filed Oct. 19, 2000, the disclosure of which is incorporated herein by reference in its entirety.

What is claimed is:

1. A pressure sensor-incorporating spark plug comprising:
   a spark plug main body including a substantially cylindrical metallic shell having a radially bulged flange portion at a center portion of the metallic shell, the flange portion having a mounting seat which abuts a cylinder head upon attachment of the spark plug to an internal combustion engine, and a tightening portion which is provided at a location apart from the mounting seat and onto which a tightening tool is fit, the tightening portion having a cross-sectional shape having a vertex portion;
   a piezoelectric element attached to the metallic shell and outputting an electric signal corresponding to cylinder internal pressure of the internal combustion engine;
   an output cable for outputting the electric signal generated by the piezoelectric; and
   a cable accommodation portion for accommodating the output cable provided at the vertex portion of the tightening portion,
   wherein the output cable is placed in the cable accommodation portion and is fixed to the tightening portion by crimping a portion of the tightening portion around the cable accommodation portion.

2. The pressure sensor-incorporating spark plug as claimed in claim 1, wherein
   the periphery of the output cable is covered with a shield for suppressing influence of external noise, and
   the shield is grounded via the tightening portion, by contacting with the tightening portion.

3. The pressure sensor-incorporating spark plug as claimed in claim 1, wherein
   the tightening portion has a cross section of a hexagon, and the distance between opposite sides of the hexagon is 15.5 to 16 mm; and
   the difference between the diameter of the insulator and the distance between opposite sides of the hexagon is 6.3 to 7.2 mm.

4. A pressure sensor-incorporating spark plug comprising:
   a spark plug main body including a substantially cylindrical metallic shell having a radially bulged flange portion at a center portion of the metallic shell, the flange portion having a mounting seat which abuts a cylinder head upon attachment of the spark plug to an internal combustion engine, and a tightening portion which is provided at a location apart from the mounting seat and onto which a tightening tool is fit, the tightening portion having a cross-sectional shape having a vertex portion;
   a piezoelectric element attached to the metallic shell and outputting an electric signal corresponding to cylinder internal pressure of the internal combustion engine;
   an output cable for outputting the electric signal generated by the piezoelectric element;
   a groove for accommodating the output cable provided on a surface of the tightening portion; and
   a fixing member for fixing the output cable to the groove,
   wherein the output cable is passed through the fixing member, the fixing member is placed in the groove, and the output cable is fixed to the groove by means of the fixing member.

5. The pressure sensor-incorporating spark plug as claimed in claim 4, wherein the fixing member surrounds the output cable; and after the output cable is passed through the fixing member and the fixing member is placed in the groove, the fixing member is deformed in a direction perpendicular to the passing direction of the output cable, such that the fixing member expands along the width direction of the groove to thereby be held by the groove, and shrinks along the depth direction of the groove to thereby nip the output cable.

6. The pressure sensor-incorporating spark plug as claimed in claim 5, wherein the periphery of the output cable is covered with a shield for suppressing influence of external noise, the fixing member is formed of an electrically conductive material, and the shield is electrically connected to the tightening portion via the fixing member, whereby the shield material is grounded via the tightening portion.

7. The pressure sensor-incorporating spark plug as claimed in claim 4, wherein the periphery of the output cable is covered with a shield for suppressing influence of external noise, the fixing member is formed of an electrically conductive material, and the shield is electrically connected to the tightening portion via the fixing member, whereby the shield material is grounded via the tightening portion.

8. The pressure sensor-incorporating spark plug as claimed in claim 4, wherein the tightening portion has a cross section of a hexagon, and the distance between opposite sides of the hexagon is 15.5 to 16 mm; and the difference between the diameter of the insulator and the distance between opposite sides of the hexagon is 6.3 to 7.2 mm.

* * * * *